United States Patent [19]

Yoshida et al.

[11] 4,370,385

[45] Jan. 25, 1983

[54] MASKING OF ABRASION INJURY ON GLASS ARTICLES

[75] Inventors: Akiteru Yoshida; Akiro Yokoo; Shuichi Yokokura, all of Takasaki; Minoru Takamizawa, Tokyo; Yoshio Inoue; Hiroshi Yoshioka, both of Annaka, all of Japan

[73] Assignee: Kirin Beer Kabushiki Kaisha, Tokyo, Japan

[21] Appl. No.: 299,249

[22] Filed: Sep. 3, 1981

Related U.S. Application Data

[63] Continuation-in-part of Ser. No. 83,126, Oct. 9, 1979, abandoned.

[30] Foreign Application Priority Data

Jul. 18, 1979 [JP] Japan .................................. 54/90330

[51] Int. Cl.$^3$ ............................................ B32B 17/10
[52] U.S. Cl. ................................ 428/429; 206/524.3; 215/DIG. 6; 252/356; 427/140; 427/154; 427/269; 427/387; 427/389.7; 427/443.2; 428/35; 528/17; 528/43; 524/807
[58] Field of Search .................... 252/356; 528/43, 17; 260/33.4 SB, 33.6 SB; 427/140, 165, 167, 168, 169, 387, 154, 269, 443.2; 428/35, 63, 429, 447; 215/12 R, DIG. 6; 206/524.3; 65/28

[56] References Cited

U.S. PATENT DOCUMENTS

| 3,437,517 | 4/1969 | Eilerman et al. ............ 427/389.7 X |
|---|---|---|
| 3,507,680 | 4/1970 | Kiel .............................. 427/407.2 X |
| 3,705,205 | 12/1972 | Antonen ................................. 528/43 |
| 3,725,105 | 4/1973 | Chase .................................... 427/140 |
| 3,801,522 | 4/1974 | Vasta ...................................... 528/43 |
| 3,899,319 | 4/1975 | Sato .................................. 528/43 X |
| 3,900,672 | 8/1975 | Hammond et al. ............. 428/429 X |
| 3,923,708 | 12/1975 | Furukawa et al. .......... 427/389.7 X |
| 4,110,094 | 8/1978 | Motsinger ...................... 427/386 X |
| 4,273,834 | 6/1981 | Yokokura et al. .................. 428/429 |

FOREIGN PATENT DOCUMENTS

| 47-9673 | 4/1972 | Japan . |
| 52/90516 | 7/1977 | Japan . |
| 53/98320 | 8/1978 | Japan . |

*Primary Examiner*—Thurman K. Page
*Attorney, Agent, or Firm*—Ladas & Parry

[57] ABSTRACT

A novel scuff-masking composition for glass vessels comprises a specific organopolysiloxane, a curing catalyst therefor, and a surfactant and is highly effective in a method of masking scuffs on glass vessels, which comprises providing the composition on the scuffs and curing the coated composition.

9 Claims, No Drawings

MASKING OF ABRASION INJURY ON GLASS ARTICLES

CROSS-REFERENCES TO OTHER RELATED APPLICATIONS

This application is a continuation-in-part of our application Ser. No. 083,126 filed Oct. 9, 1979, now abandoned.

BACKGROUND OF THE INVENTION

This invention relates to the masking of abrasion injury such as marks due to grazing, scratching, galling, scoring, and like abrasive action (hereinafter referred to collectively as "scuffs") on glass articles, particularly glass vessels, especially returnable glass vessels.

The glass vessels which are used for beer, refreshing beverages, milk and the like in some countries are generally returnable, and are recovered after use from the market and reused. The glass vessels such as bottles which are to be recovered and reused repeatedly come in contact with each other or, for example, with metallic articles, in the course of bottling processes or transportation, whereby scuffs are left on the surfaces of the glass vessels. As a result, the appearance of the glass vessels is markedly impaired, and the commodity value of the resulting bottled beverages is lowered.

Accordingly, it has been considered to coat a masking agent onto the scuffed parts on the surfaces of glass vessels to mask such scuffs. Some masking agents have been proposed but are not fully satisfactory as far as we are aware.

The reason for this is that a scuff-masking agent for the above mentioned purpose must simultaneously satisfy several requirements, but the known masking agents are not satisfactory in this respect.

In general, a coat film provided on the scuffed parts of a glass vessel must satisfy the following requirements. (1) The film must have good scuff-masking property. (2) It must have good water resistance. (3) It must have no surface tackiness. (4) The required properties such as hardness and strength of the film must be exhibited at temperatures in the vicinity of room temperature. (5) The masking material itself must not be toxic, and a solvent, if used, must not be toxic. (6) The films must be readily and completely removable by washing with an alkaline solution in a bottle-washing step or the like.

First of all, this film must, of course, have good scuff-masking property, but it also must have good water resistance. The glass vessels filled with beer, refreshing beverages and the like are often immersed in chilled water contained in a show-case or tank in summer. Thus, the coat film provided on a glass vessel is required to have high water resistance such that the film is not removed even when the vessel is immersed in water for several weeks. Moreover, such glass vessels are generally handled with bare hands. When surfaces of the film of the glass vessels are tacky, the handlers experience an unpleasant sensation, and the film surface may be contaminated with dust from the atmosphere. On the other hand, in the case where heating is necessary to have the coated films cured or crosslinked to obtain the properties required for the masking films such as hardness and strength, there is the risk of deterioration of the contents contained in the vessels since the coating with scuff-masking agent is normally carried out after the vessels are filled with the contents, because scuffs are sometimes produced in the filling step. This situation is the same as that in the case where irradiation with light rays is employed instead of heating.

Since such glass vessels accommodate foodstuffs, the coat film materials must be nonpoisonous and odorless, and a solvent to be used when a coat film is formed from a solution must also be nonpoisonous (this being also required from the point of view of the working environment). Thus, organic solvents other than alcohols should not be used. In other words, the film materials themselves or the precursors thereof should be soluble in alcohols, especially in ethanol.

Another important property required of the film is that it must have good removability in a bottle-washing step with an alkaline solution. In general, such glass vessels are collected and are then subjected to washing and sterilization in a bottle-washing machine with an alkaline solution, wherein, ordinarily, aqueous sodium hydroxide of about 2 to about 4% concentration is used and the operation is carried out for about 10 to about 20 minutes at a temperature of 60° to 80° C., the glass vessels thus washed being then reused. If the coat films are not completely stripped by the alkaline solution of the bottle-washing machine, and some parts thereof remain on the glass surfaces, the scuff-masking agent will be again put on the resulting uneven surfaces, whereby the aesthetic appearance of the coated surfaces will be impaired.

In this connection, a method of masking scuffs which comprises establishing strong films (permanent films) which cannot be removed with an alkaline solution on the scuffed surfaces of glass vessels has been proposed. However, since the glass vessels are repeatedly collected and reused, it is difficult to prevent scuffs from being produced on the permanent films themselves. Furthermore, when the vessels are repeatedly washed with an alkaline solution, the appearance of the films is apt to deteriorate. That is, the films may become white-opaque, for example. Moreover, a thicker film (50 $\mu$m or more) is generally required to obtain such a permanent film, which entails a cost problem. To the best of our knowledge at present, the method of using permanent films is not practicable.

As mentioned above, there have been proposed several scuff-masking agents. In addition, variety of coating materials including scuff-preventing agents and breakage-preventing agents are known. All of these agents do not completely satisfy the above enumerated requirements. For example, (1) Surfactants have poor water resistance. When surfactants having an hydrophile-lipophile balance (HLB) of 9 or more are used, the resulting coat films are removed when immersed in water for about 4 to 5 hours. Generally, surfactants result in greater tackiness. (2) Liquid paraffins have very poor water resistance. In the case of solid paraffins (having melting points of 42° C. or higher), the resulting coat films have good removability in a bottle-washing operation. The stripped material, however, floats as scum on the surface of the alkaline solution in the bottle-washing machine and is redeposited on the glass surfaces to interfere with the bottle-washing operation. (3) Organic high-molecular materials (resins) which are coated in the form of aqueous emulsions result in coat films which have very poor water resistance unless they are protected by heating or irradiation with light rays. When they are provided in the form of solutions dissolved in organic solvents, there exist problems such as poor removability of the resulting dried film with an alkaline solution in a bottle-washing machine and toxicity of the organic solvent used, although the resulting films have good water resistance and absence of surface tackiness. When the high-molecular materials are of the type which requires curing after coating, a considerably high heating temperature is required.

SUMMARY OF THE INVENTION

An object of the invention is to solve the above described problems. This object has been achieved by the use as the scuff-masking agent of a specific and restricted silicone resin blended with a surfactant.

More specifically, the scuff-masking composition for glass vessels according to the present invention comprises the following components A, B and C:

Component A
an organopolysiloxane represented by the following average compositional formula,

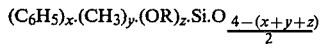

wherein R is an alkyl group having 1 to 4 carbon atoms, and x, y and z are numbers having the following relationship, $$1 \leq x+y < 2$$

$$1 \leq y/x < 10$$

$$0.4 \leq z < 2;$$

Component B
a curing catalyst for the component A; and
Component C
a surfactant, the quantity of which is up to 15% by weight of the organopolysiloxane.

According to this invention in another aspect thereof, there is also provided a method of masking the scuffs on glass vessels which comprises providing the following organopolysiloxane composition on the scuffed parts of the glass vessels and curing the composition, the composition comprising the following components A, B and C:

Component A
an organopolysiloxane represented by the following average compositional formula,

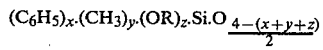

wherein R is an alkyl group having 1 to 4 carbon atoms, and x, y and z are numbers having the following relationship, $$1 \leq x+y < 2$$

$$1 < y/x < 10$$

$$0.4 \leq z < 2;$$

Component B
a curing catalyst for the component A; and
Component C
a surfactant, the quantity of which is up to 15% by weight of the organopolysiloxane.

In accordance with the steps of coating and curing the mixture of the specific organopolysiloxane and a surfactant, it is possible to use ethanol as a solvent (if required) and to form at room temperature a coat film having excellent scuff-masking property and water resistance, and no surface tackiness, while exhibiting good removability when the collected vessels are alkali-washed in a bottle-washing machine.

As mentioned hereinbefore, a surfactant is not suitable as a scuff-masking agent when it is employed by itself on the points of water resistance and surface tackiness. Accordingly, the realization of the above-mentioned features of efficacy by adding a small amount of the surfactant into the cured organopolysiloxane was quite unexpected.

DETAILED DESCRIPTION OF THE INVENTION

1. Glass Vessels to Be Treated

The present invention can be applied to any glass vessel which has been recovered from the market and can be reused, such as the glass bottles for beer, refreshing beverages, milk, etc.

The term "glass vessel" is used herein irrespectively of whether or not it is filled with contents. Since the method of the present invention does not require heating or irradiation with light rays, the advantage of the present invention will be best exhibited when glass vessels filled with their contents are treated.

Throughout this disclosure, quantities expressed in "parts" and "percent" are by weight.

2. Organopolysiloxane Compositions (1) Organopolysiloxane (Component A)

The organopolysiloxane to be used in the present invention is represented by the following average compositional formula;

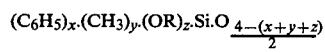

wherein, R in the alkoxy group is a $C_1$ to $C_4$ alkyl group such as a methyl, ethyl, n- or i- propyl, or n-, i- or t-butyl group. An ethyl group is most preferred from the viewpoint of curing property and toxicity. x, y and z are numbers having the following relationship, $$1 \leq x+y < 2$$

$$1 < y/x < 10$$

$$0.4 \leq z < 2.$$

The restriction of x, y and z is significant from the viewpoint of the scuff-masking of the glass vessels. When the sum x+y is less than 1, cracks are apt to be formed in the resulting cured films, and the composition blended with a curing catalyst exhibits poor storing stability. When the sum is greater than 2, it becomes difficult to obtain good cured films. When the ratio y/x is 1 or less, the resulting cured film exhibits poor decomposability in an alkaline washing solution, while the scuff-masking effect becomes inferior when the ratio is 10 or more. When the ratio y/x, which is the ratio of the quantity of methyl group to the quantity of phenyl group, is too large (more than 10), it is considered that the masking effect is lowered possibly because the refractive index of the resulting film is decreased and the difference between the refractive index of glass and that of the cured film is increased. When the number z, which indicates the quantity of the group RO, is less than 0.4, the curing velocity of the composition is too slow to be practicable. When z is 2 or more, the resulting cured film is likely to have cracks, and the composition blended with a curing agent has poor storing stability. Incidentally, the RO groups may be converted partly to hydroxyl groups in the course of preparation. There is no problem, however, when the quantity of the resulting compound having hydroxyl groups is within 1% of the organopolysiloxane.

Such organopolysiloxanes can readily be obtained by way of conventional or appropriate processes. Examples of such processes are: (1) a process comprising partial hydrolysis of a member selected from methyltrialkoxysilanes, dimethyldialkoxysilanes, trimethylalkoxysilanes, tetraalkoxysilanes, phenyltrialkoxysilanes, diphenyldialkoxysilanes, methylphenyldialkoxysilanes, dimethylphenylalkoxysilanes, methyldiphenylalkoxysilanes and mixtures thereof; (2) a process comprising partial hydrolysis-alkoxylation by reaction of water, alcohol and the chlorosilanes corresponding to the above-mentioned alkoxysilanes; and (3) a process comprising condensation with elimination of an alkylchloride of (A) the above-mentioned alkoxysilanes, the partial hydrolyzates, polysilicates or mixtures thereof with (B) the chlorosilanes corresponding to the alkoxysilanes of (C) their (co)hydrolyzates.

The viscosity of an organopolysiloxane to be used in the present invention is of the order of 10 to 10,000 centistokes at 25° C.

(2) Curing catalyst (Component B)

The catalysts which are known as condensation-curing catalysts for organopolysiloxanes can, in general, be used in the present invention.

More specifically, examples of such curing catalysts are: (1) organic amines such as triethanolamine; (2) metal salts of carboxylic acids such as zinc octanoate and tin octanoate; (3) organotin compounds such as dibutyltin dilaurate and dibutyltin dioctanoate; (4) titanates such as tetrabutyl titanate and tetrapropyl titanate; (5) aluminium organic compounds such as acetylacetone aluminium salt; and (6) boron fluoride complexes such as boron trifluoride triethylamine complex. From the viewpoint of safety and hygiene, dibutyltin dilaurate and tetrabutyl titanate are preferred.

A suitable quantity in which the catalyst is used is of the order of 0.05 to 10 parts, preferably 0.1 to 5 parts per 100 parts of the organopolysiloxane.

(3) Surfactant (Component C)

The surfactants which can be used in accordance with the present invention to facilitate the decomposition of the cured films of the above-mentioned organopolysiloxane with an alkaline washing solution are not especially restricted, provided that the surfactants are soluble in the organopolysiloxane and a solvent (if used) and also have no adverse effect on the curing properties of the organopolysiloxane.

Specific examples of such surfactants are: (1) anionic surfactants such as fatty acid salts (generally, water-soluble salts of monocarboxylic acids having about 12 to about 18 carbon atoms), sulfate ester salts of higher alcohols (generally, water-soluble sulfate ester salts of monohydric alcohols having about 8 to about 18 carbon atoms), phosphate ester salts of higher alcohols (generally, water-soluble phosphate ester salts of monohydric alcohols having about 6 to about 14 carbon atoms), and sulfonate ester salts of fatty acid alkylolamides (generally, sulfonate ester salts of monocarboxylic acid amides having about 11 to about 18 carbon atoms); (2) cationic surfactants such as fatty amines (generally, inorganic acid salts of primary through tertiary amines having alkyl group(s) with about 6 to about 12 carbon atoms), and quaternary ammonium salts (generally, quarternarized products of tertiary amines having alkyl groups with about 12 to about 18 carbon atoms); (3) nonionic surfactants such as polyoxyethylene alkylethers (generally, monohydric alcohols having about 6 to about 16 carbon atoms to which about 2 to about 8 mols of ethylene oxide (EO) has been added), polyoxyethylenephenyl- or alkylphenyl-ethers (generally, monoalkylphenols having about 7 to about 10 carbon atoms to which about 4 to about 15 mols of EO has been added), polyoxyethylene fatty acid esters (generally, monocarboxylic acids having about 12 to about 18 carbon atoms to which about 8 to about 12 mols of EO has been added), propylene glycol fatty acid esters (generally, monoesters of monocarboxyl acids having about 12 to about 18 carbon atoms), glycerine fatty acid esters (generally, mono- or diesters of monocarboxylic acids having about 12 to about 18 carbon atoms), sorbitan fatty acid esters (generally, mono- or diesters of monocarboxyl acids having about 12 to about 18 carbon atoms), polyoxyethylene sorbitan fatty acid esters (generally, esters of monocarboxyl acids having about 12 to about 18 carbon atoms, into which about 6 to about 20 mols of EO has been added), and sucrose fatty acid esters (generally, mono- or diesters having about 12 to about 18 carbon atoms); and (4) amphoteric or zwitterconic surfactants such as amine oxides and phosphine oxides.

Among these surfactants, nonionic surfactants are especially suitable for use in the present invention. From the viewpoint of safety and hygiene propylene glycol fatty acid esters, glycerine fatty acid esters, sorbitan fatty acid esters and sucrose fatty acid esters (specifically as described above) are preferred. These may be used in combination if desired.

The quantity of surfactant to be used is up to 15 parts, preferably 0.05 to 15 parts and especially 0.1 to 10 parts per 100 parts of the organopolysiloxane. When the quantity of the surfactant is less than 0.05 parts, the efficacy and utility of the present invention cannot be fully exhibited, that is, the decomposability of the resulting cured film with an alkaline washing solution cannot be sufficiently enhanced. When the quantity of the surfactant is above 15 parts, the transparency and/or water resistance of the cured film is impaired and the curing property also deteriorates.

(4) Type of the Composition

Each of the organopolysiloxane compositions to be used in the present invention comprises the above mentioned components. More specifically, the compositions may consist essentially of these components and may also contain in addition thereto a variety of auxiliary components such as, for example, dispersion media, stabilizers, thixotropic agents, coloring agents, fillers, compatible polymers.

When organic solvents are used to prepare solutions or dispersions, ethanol is preferred from the viewpoint of safety and hygiene. If circumstances permit, however, other alcohols and especially lower alcohols such as methanol, propanol and butanol, or other organic solvents having the desired dissolving ability can be used.

3. Coating of Glass Vessels

The coating of glass vessels with such organopolysiloxane compositions can be carried out by any appropriate conventional method such as, for example, the dipping method, spraying method, brushing method, flow-coater method, or transfer coating method.

The composition is generally put on the scuffed parts, but the coating area is not restricted to only the scuffed parts.

After the coating, the coated glass vessels are allowed to stand at room temperature for a period of the order of 0.5 to 5 hours, whereupon cured films having no surface tackiness are formed on the glass vessels. It is permissible, however, to heat the coated vessels in order, for example, to shorten the curing time and to remove the solvents used provided that the temperature does not impair the contents in the vessels (for example, at about 50° C.).

The thickness of the cured films can be suitably selected. The efficacy and utility of the present invention can be best exhibited when the cured films are relatively thin. Thus, the suitable thickness of the coat films is generally 0.5 to 10 μm, preferably 1 to 3 μm. The scuff-masking property will become insufficient if the films are thinner than 0.1 μm. When the films are thicker than 10 μm, the removability of the film with an alkaline solution upon washing bottles becomes insufficient.

4. Experiments

Reference Example 1

Preparation of alkoxy group-containing organopolysiloxane.

A reactor equipped with a stirrer, a thermometer, a reflux condenser and a dropping funnel is charged with 1,602 grams (g.) of methyltriethoxysilane (9 mols) and 272 g. of diphenyldiethoxysilane (1 mol). The mixture is heated to 80° C., and 144 g of an aqueous solution containing 0.1% by weight of sulfuric acid is added dropwise thereto with stirring. Reaction is continued for another 3 hours at this temperature. The reacted product is then heated to 180° C., while the distillate (ethanol and unreacted silane produced) is distilled away through a distillation column.

Thus, in an actual instance, an alkoxy group-containing organopolysiloxane was obtained in a yield of 1,198 g, which had a viscosity of 128 centistokes (at 25° C.), a content of ethoxy groups of 30.2%, and a refractive index of 1.442.

The resulting product is an organopolysiloxane represented by the following average compositional formula.

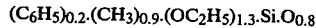

$(C_6H_5)_{0.2} \cdot (CH_3)_{0.9} \cdot (OC_2H_5)_{1.3} \cdot Si \cdot O_{0.8}$ $x+y=1.1, \ y/x=4.5, \ z=1.3$

Examples 1 through 11 and Comparison Examples 1 through 4

The compositions containing the components shown in Table 1 were provided with a brush on the surfaces of beer bottles parts of which were whitened by scuffs, the coating being controlled to form coating films of about 3-μm thickness. The coated bottles were allowed to stand for 4 days at room temperature to cure the coat films. The properties of the resulting films were measured, whereupon the results shown in Table 1 were obtained.

The properties of the coat films were measured in the following manner.

(1) Appearance and scuff-masking property;

These were observed with the naked eye.

(2) Water resistance:

The coated sample was immersed in water at 25° C. and the immersion time until a part of the coat film was removed was determined. The sample was judged to be "good" when the immersion time was one week or longer and judged to be "poor" when the immersion time was shorter than one week.

(3) Adhesiveness:

This was measured by a cross-cut pressure-sensitive cellophane tape peel test. The adhesiveness was expressed by the number of the cross cuts out of 100 cross cuts which were not peeled by the pressure-sensitive cellophane tape pressed to the cross cuts.

(4) Removability in a bottle-washing machine:

The coated bottles were immersed in an aqueous solution containing 3.0% of sodium hydroxide at 65° C., and the immersion time required for complete removal of the films provided on the bottles was measured.

(5) Tackiness:

The scuff-masking composition to be tested was provided on an area measuring 10 mm (vertical direction)×40 mm (circumferential direction) of a beer bottle of 633-C.C. capacity, the area to be coated being positioned around the body of the bottle with a center 140 mm from the bottom thereof. The coated bottles were allowed to stand for 4 days at room temperature. The coated surface of each bottle was then caused to undergo one rotation on carborundum powder of 60-mesh size. The quantity of carborundum then adhering to the bottle was measured, and this quantity per cm² of the coated surface was calculated. The tackiness of uncoated glass surface was 0.3 mg/cm². In this test, the surface is judged to have "no tackiness" when the adhering quantity is 3 mg/cm² or less.

TABLE 1

| | Organopolysiloxane | | | | Curing Catalyst | | Surfactant | | | Solvent | | Properties of Coat Films | | | | | | |
|---|---|---|---|---|---|---|---|---|---|---|---|---|---|---|---|---|---|---|
| | R | x+y | y/x | z | Type | Quantity*1 | Type | Trade-name/maker | Quantity*2 | Type | Quantity*1 | Appearance (Transparency) | Scuff-masking property | Water resistance | Adhesiveness | Alkali-removability (min.) | Tackiness (mg/cm$^2$) |
| EXAMPLE | | | | | | | | | | | | | | | | | |
| 1 | $C_2H_5$ | 1.1 | 4.5 | 1.3 | tetrabutyl titanate | 1.0 | polyether-sulfate | Nissan Trax H-45/ Nippon Yushi | 1.0 | none | — | good | good | good | 100/100 | 5 | 0.3 |
| 2 | $C_2H_5$ | 1.1 | 4.5 | 1.3 | tetrabutyl titanate | 1.0 | quaternary ammonium salt | Nissan Cation BB/ Nippon Yushi | 0.5 | methanol | 200 | good | good | good | 100/100 | 11 | 0.3 |
| 3 | $C_2H_5$ | 1.1 | 4.5 | 1.3 | tetrabutyl titanate | 1.0 | glyceryl mono-oleate | Atmos 300/ Kao Atlas | 2.0 | ethanol | 200 | good | good | good | " | 10 | 0.5 |
| 4 | $C_2H_5$ | 1.1 | 4.5 | 1.3 | tetrabutyl titanate | 1.0 | propylene glycol mono-laurate | Nikkol PML-F/ Nikko Chemical | 3.0 | ethanol | 200 | good | good | good | " | 15 | 0.5 |
| 5 | $C_2H_5$ | 1.1 | 4.5 | 1.3 | tetrabutyl titanate | 1.0 | sucrose fatty acid ester | F-160/ Daiichi Kogyo Seiyaku | 1.0 | methanol | 300 | good | good | good | " | 2 | 0.3 |
| 6 | $C_2H_5$ | 1.1 | 4.5 | 1.3 | tetrabutyl titanate | 1.0 | sorbitan mono-laurate | Span-20/ Kao Atlas | 0.5 | ethanol | 200 | good | good | good | " | 12 | 0.3 |
| 7 | $C_2H_5$ | 1.1 | 4.5 | 1.3 | tetrabutyl titanate | 1.0 | sorbitan mono-laurate | Span-20/ Kao Atlas | 5.0 | ethanol | 200 | good | good | good | " | 3 | 0.8 |
| 8 | $C_2H_5$ | 1.1 | 4.5 | 1.3 | tetrabutyl titanate | 1.0 | sorbitan mono-laurate | Span-20/ Kao Atlas | 10.0 | ethanol | 200 | good | good | good | " | 2 | 1.4 |
| 9 | $C_2H_5$ | 1.6 | 3.0 | 1.55 | tetra-propyl titanate | 0.5 | polyethyleneglycol alkyl-phenyl-ether | Nissan Nonion NS-210/ Nippon Yushi | 0.5 | ethanol | 200 | good | good | good | " | 7 | 0.3 |
| 10 | $C_2H_5$ | 1.6 | 3.0 | 1.55 | tetra-propyl titanate | 0.5 | polyethyleneglycol alkyl-phenyl-ether | Nissan Nonion NS-210/ Nippon Yushi | 5.0 | ethanol | 200 | good | good | good | " | 2 | 0.9 |
| 11 | $C_2H_5$ | 1.6 | 3.0 | 1.55 | tetra-propyl titanate | 0.5 | polyethyleneglycol phenyl-ether | Nissan Nonion NS-210/ Nippon Yushi | 10.0 | ethanol | 200 | good | good | good | " | 1 | 1.9 |
| COMPARATIVE | | | | | | | | | | | | | | | | | |

TABLE 1-continued

| EXAMPLE | Organopolysiloxane | | | | Curing Catalyst | | Surfactant | | | Solvent | | Properties of Coat Films | | | | | |
|---|---|---|---|---|---|---|---|---|---|---|---|---|---|---|---|---|---|
| | R | x+y | y/x | z | Type | Quantity*1 | Type | Trade-name/maker | Quantity*2 | Type | Quantity*1 | Appearance (Transparency) | Scuff-masking property | Water resistance | Adhesiveness | Alkali-removability (min.) | Tackiness (mg/cm²) |
| 1*3 | C₂H₅ | 1.1 | 4.5 | 1.3 | tetrabutyl titanate | 1.0 | none | | | ethanol | 200 | good | good | good | " | 32 | 0.3 |
| 2*3 | C₂H₅ | 1.6 | 3.0 | 1.55 | tetrapropyl titanate | 0.5 | none | | | ethanol | 200 | good | good | good | " | 35 | 0.3 |
| 3*4 | C₂H₅ | 1.1 | 4.5 | 1.3 | tetrabutyl titanate | 1.0 | sorbitan monolaurate | Span 20 | 20.0 | ethanol | 200 | slightly white opaque | good | poor | not measurable | 1 | 12.6 |
| 4*4 | C₂H₅ | 1.6 | 3.0 | 1.55 | tetrapropyl titanate | 0.5 | polyethyleneglycol alkylphenylether | Nissan Nonion NS-210 | 20.0 | ethanol | 200 | white opaque | good | poor | not measurable | 1 | 14.7 |

*¹Parts by weight per 100 parts by weight of organopolysiloxane
*²Parts of the effective component by weight per 100 parts by weight of organopolysiloxane
*³Comparative Examples 1 and 2 are directed to the compositions disclosed in U.S. Ser. No. 083,125 now U.S. Pat. No. 4,273,834, filed on October 9, 1979.
*⁴Comparative Examples 3 and 4 are to show that the use of a surfactant in a quantity larger than 15% by weight of the organopolysiloxane is inadequate.

What is claimed is:

1. A scuff-masking composition for glass articles which comprises, in solution if solvent is present:

*Component A* which is an organopolysiloxane represented by the average compositional formula $$(C_6H_5)_x \cdot (CH_3)_y \cdot (OR)_z \cdot SiO_{\frac{4-(x+y+z)}{2}}$$

wherein R is an alkyl group having 1 to 4 carbon atoms, and x, y and z are the numbers having the relationship $1 \leq x+y < 2$ $1 < y/x < 10$ $0.4 \leq z < 2;$

*Component B* which is a curing catalyst for component A; and

*Component C* which is a surfactant, the quantity of the surfactant being in amounts sufficient to improve removability of the cured product by aqueous alkali said composition being curable at up to about 50° C.

2. The composition as set forth in claim 1, in which the composition is in the form of an alcohol solution.

3. A method of masking scuffs on glass articles, which comprises coating the scuffed part of the glass article with an organopolysiloxane composition and curing the composition at a temperature up to about 50° C., said composition comprising, in solution if the solvent is present:

*Component A* which is an organopolysiloxane represented by the average compositional formula $$(C_6H_5)_x \cdot (CH_3)_y \cdot (OR)_z \cdot SiO_{\frac{4-(x+y+z)}{2}}$$

wherein R is an alkyl group having 1 to 4 carbon atoms, and x, y and z are the numbers bearing the relationship $1 \leq x+y < 2$ $1 < y/x < 10$ $0.4 \leq z < 2;$

*Component B* which is a curing catalyst for component A; and

*Component C* which is a surfactant, the quantity of the surfactant being in amounts sufficient to improve removability of the cured product by aqueous alkali, said composition being curable at up to about 50° C.

4. The method as set forth in claim 3, in which the composition is in the form of an alcohol solution.

5. The glass article which has a coat film on at least a part of its surface thereby masking scuffs on the surface, the film being a cured product of the composition claimed in claim 1 or 2.

6. The composition as set forth in claim 1 or 2, in which the surfactant is selected from the group of nonionic surfactants.

7. The composition as set forth in claim 1 or 2, in which the surfactant is a nonionic surfactant selected from the group consisting of propylene glycol fatty acid esters, glycerine fatty acid esters, sorbitan fatty acid esters, and sucrose fatty acid esters.

8. The method as set forth in claim 3 or 4, in which the surfactant is selected from the group of nonionic surfactants.

9. The method as set forth in claim 3 or 4, in which the surfactant is a nonionic surfactant selected from the group consisting of propylene glycol fatty acid esters, glycerine fatty acid esters, sorbitan fatty acid esters, and sucrose fatty acid esters.

* * * * *

UNITED STATES PATENT AND TRADEMARK OFFICE
CERTIFICATE OF CORRECTION

PATENT NO. : 4,370,385
DATED : January 25, 1983
INVENTOR(S) : Akiteru YOSHIDA et al It is certified that error appears in the above-identified patent and that said Letters Patent is hereby corrected as shown below:

```
Title page, after "[73] Kirin Beer Kabushiki Kaisha,

Tokyo, Japan"

insert

-- Shin-Etsu Kagaku Kogyo

Kabushiki Kaisha, Tokyo, Japan
```

Signed and Sealed this

Sixth Day of May 1986

[SEAL]

Attest:

Attesting Officer

DONALD J. QUIGG

Commissioner of Patents and Trademarks